Figure 1:
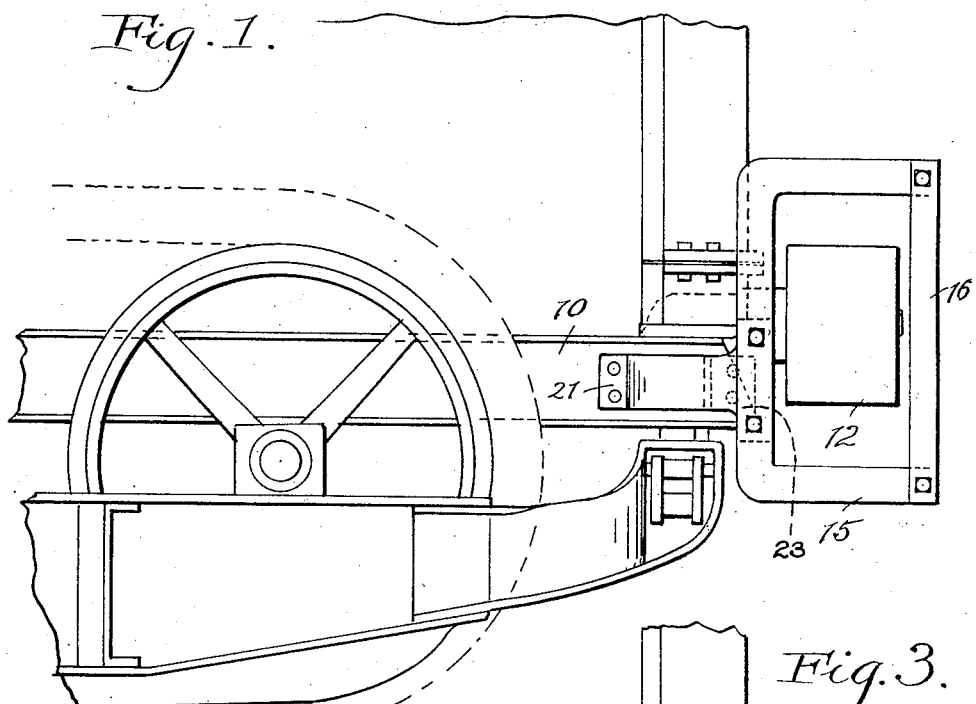

M. B. MORGAN.
BELT GUIDE FOR TRACTORS.
APPLICATION FILED SEPT. 15, 1919.

1,394,106.

Patented Oct. 18, 1921.

Inventor
Mathew B. Morgan
by Thurston Kwis & Hudson
Attorneys

UNITED STATES PATENT OFFICE.

MATHEW B. MORGAN, OF CLEVELAND HEIGHTS, OHIO, ASSIGNOR TO THE CLEVELAND TRACTOR COMPANY, OF EUCLID, OHIO, A CORPORATION OF OHIO.

BELT-GUIDE FOR TRACTORS.

1,394,106.

Specification of Letters Patent.  Patented Oct. 18, 1921.

Application filed September 15, 1919. Serial No. 323,695.

*To all whom it may concern:*

Be it known that I, MATHEW B. MORGAN, a citizen of the United States, residing at Cleveland Heights, in the county of Cuyahoga and State of Ohio, have invented a certain new and useful Improvement in Belt-Guides for Tractors, of which the following is a full, clear, and exact description.

It is common to provide tractors with belt pulleys, in order that the owner of the tractor may utilize the power plant on the tractor to drive various kinds of stationary machinery.

The present invention relates to a belt guide adapted to be applied to the tractor in order to facilitate the use of the tractor for the stated purpose.

The object of the invention is to provide a belt guide which is very inexpensive, and which can be easily and quickly fixed to the tractor in operative position with respect to the belt pulley and a belt applied thereto; and may be easily and quickly removed from the tractor so that it will not be in the way when the tractor is used for hauling purposes.

The invention consists in the combination of parts shown in the drawing, and hereinafter described and pointed out definitely in the appended claim.

Figure 3:
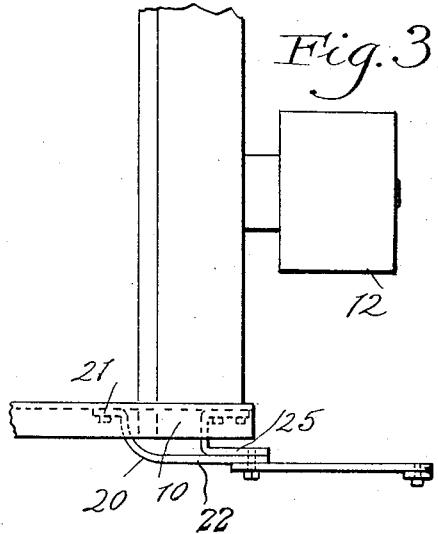
Figure 2:
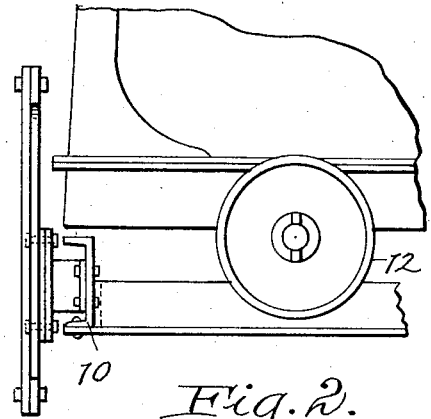

In the drawing, Figure 1 is a side elevation in the front end of a tractor to which the invention is applied; Fig. 2 is a front elevation of a little more than half of the tractor; Fig. 3 is a plan view of a little more than half of the front end of the tractor and the belt guide applied thereto.

Referring to the parts, by numerals; 10 represents one of the side beams of the main frame of the tractor; 12 represents a belt pulley, located at the front end of the tractor frame and suitably mounted thereon; and of course suitably connected with the power plant of the tractor. So much of the mechanism shown as is above described is old.

The belt guide includes a substantially rectangular frame 15 having a removable front side 16; and two brace bars 20 and 25, which are bolted to the outer face of the side beam 10 of the tractor frame, and are also bolted to each other and to the vertical back member of said guide frame. These brace bars are so shaped and proportioned, substantially as shown, that when they are connected with the tractor frame member and with the belt guide frame, the latter will stand in a vertical position in front of the tractor frame, with the open center of the guide frame to one side of and in alinement with the belt pulley, whereby both runs of the belt which goes over the pulley, will pass through the open center of said frame, and the front and rear side members of the frame will prevent the belt from running off the pulley.

The member 20 has a foot piece 21, which lies against and is bolted to the outer face of the frame member 10 near the front end thereof. It has a forwardly extended body part 22, which is bent away from the frame member and then forward in parallel relation to said frame member; and at its front end has a vertical T head 23.

The member 25 is U-shaped; and one leg thereof is bolted to the outer face of the frame member, while the other leg is secured to the T head 23 by the same bolts which fasten it to the rear vertical member of the belt guide frame.

Having described my invention, I claim,

A belt guide, comprising a rectangular frame and two members for connecting said frame to the tractor frame in operative position with respect to said belt pulley, one of said members having a T-shaped front end, a laterally bent body and a foot at the rear end adapted to be connected with a frame member of the tractor, and a U-shaped member, one of whose legs is adapted to be connected with the same side frame member of the tractor,—the other leg of said U-shaped member and the T-shaped head of the other member being connected with the rear vertical side of said rectangular frame.

In testimony whereof, I hereunto affix my signature.

MATHEW B. MORGAN.